United States Patent
Maie

(10) Patent No.: US 11,000,894 B2
(45) Date of Patent: May 11, 2021

(54) METAL POWDER MATERIAL FOR METAL POWDER LAMINATION MOLDING

(71) Applicant: Sodick Co., Ltd., Kanagawa (JP)

(72) Inventor: Nobuo Maie, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 133 days.

(21) Appl. No.: 16/135,004

(22) Filed: Sep. 19, 2018

(65) Prior Publication Data

US 2019/0111477 A1  Apr. 18, 2019

(30) Foreign Application Priority Data

Oct. 13, 2017  (JP) .............................. JP2017-199218

(51) Int. Cl.
*C22C 38/14* (2006.01)
*B22F 1/00* (2006.01)
(Continued)

(52) U.S. Cl.
CPC ............ *B22F 1/0011* (2013.01); *B22F 10/20* (2021.01); *B33Y 70/00* (2014.12);
(Continued)

(58) Field of Classification Search
None
See application file for complete search history.

(56) References Cited

U.S. PATENT DOCUMENTS 3,980,445 A * 9/1976 Aleshin .............. B01D 39/2034
  428/566
4,443,254 A  4/1984 Floreen
  (Continued)

FOREIGN PATENT DOCUMENTS

JP  S57104649  6/1982
JP  S609712  1/1985
  (Continued)

OTHER PUBLICATIONS

"Office Action of Japan Counterpart Application," with English translation thereof, dated Dec. 11, 2019, p. 1-p. 11.
"Office Action of China Counterpart Application", dated Jul. 22, 2020, with English translation thereof, p. 1-p. 11.

*Primary Examiner* — George Wyszomierski
(74) *Attorney, Agent, or Firm* — JCIPRNET

(57) ABSTRACT

A metal powder material containing no cobalt that is used to produce a three-dimensionally molded article from maraging steel in metal powder lamination molding. The metal powder material contains iron at 76 weight % or more, carbon at 0.03 weight % or less, silicon at 0.12 weight % or less, manganese at 0.12 weight % or less, nickel at 17 weight % or more and 19 weight % or less, molybdenum at 1.5 weight % or more and 2.5 weight % or less, titanium at 0.5 weight % or more and 2.0 weight % or less, aluminum at 1.5 weight % or less (including 0 weight %), with the remainder being inevitably incorporated impurities, and a content of impurities is less than 0.01 weight % for each impurity. Therefore, after aging treatment, the three-dimensionally molded article formed by the metal powder material of the present invention has characteristic of maraging steel, and sufficiently high hardness and relatively high tensile strength can be obtained.

4 Claims, 1 Drawing Sheet

(51) Int. Cl.
    *C22C 33/02*         (2006.01)
    *B22F 10/20*         (2021.01)
    *B33Y 70/00*         (2020.01)
    *C22C 38/02*         (2006.01)
    *C22C 38/04*         (2006.01)
    *C22C 38/06*         (2006.01)
    *C22C 38/08*         (2006.01)
    *C22C 38/12*         (2006.01)

(52) U.S. Cl.
    CPC .......... *C22C 33/0285* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *B22F 2301/35* (2013.01); *B22F 2304/10* (2013.01); *B22F 2998/10* (2013.01); *B22F 2999/00* (2013.01)

(56) References Cited

U.S. PATENT DOCUMENTS

| | | | | |
|---|---|---|---|---|
| 5,545,323 | A | * | 8/1996 | Koehler ................ B01D 29/111 |
| | | | | 210/493.2 |
| 5,629,091 | A | * | 5/1997 | Rao ....................... B22F 1/0096 |
| | | | | 428/403 |
| 8,686,367 | B2 | | 4/2014 | Shah |
| 2007/0111023 | A1 | * | 5/2007 | Bailey .................... C21D 6/001 |
| | | | | 428/683 |
| 2017/0173688 | A1 | | 6/2017 | Miyashita |
| 2017/0209923 | A1 | | 7/2017 | Giovannetti et al. |

FOREIGN PATENT DOCUMENTS

| | | |
|---|---|---|
| JP | 2007016312 | 1/2007 |
| JP | 5579893 | 8/2014 |
| JP | 2017110271 | 6/2017 |
| JP | 2017529453 | 10/2017 |

* cited by examiner

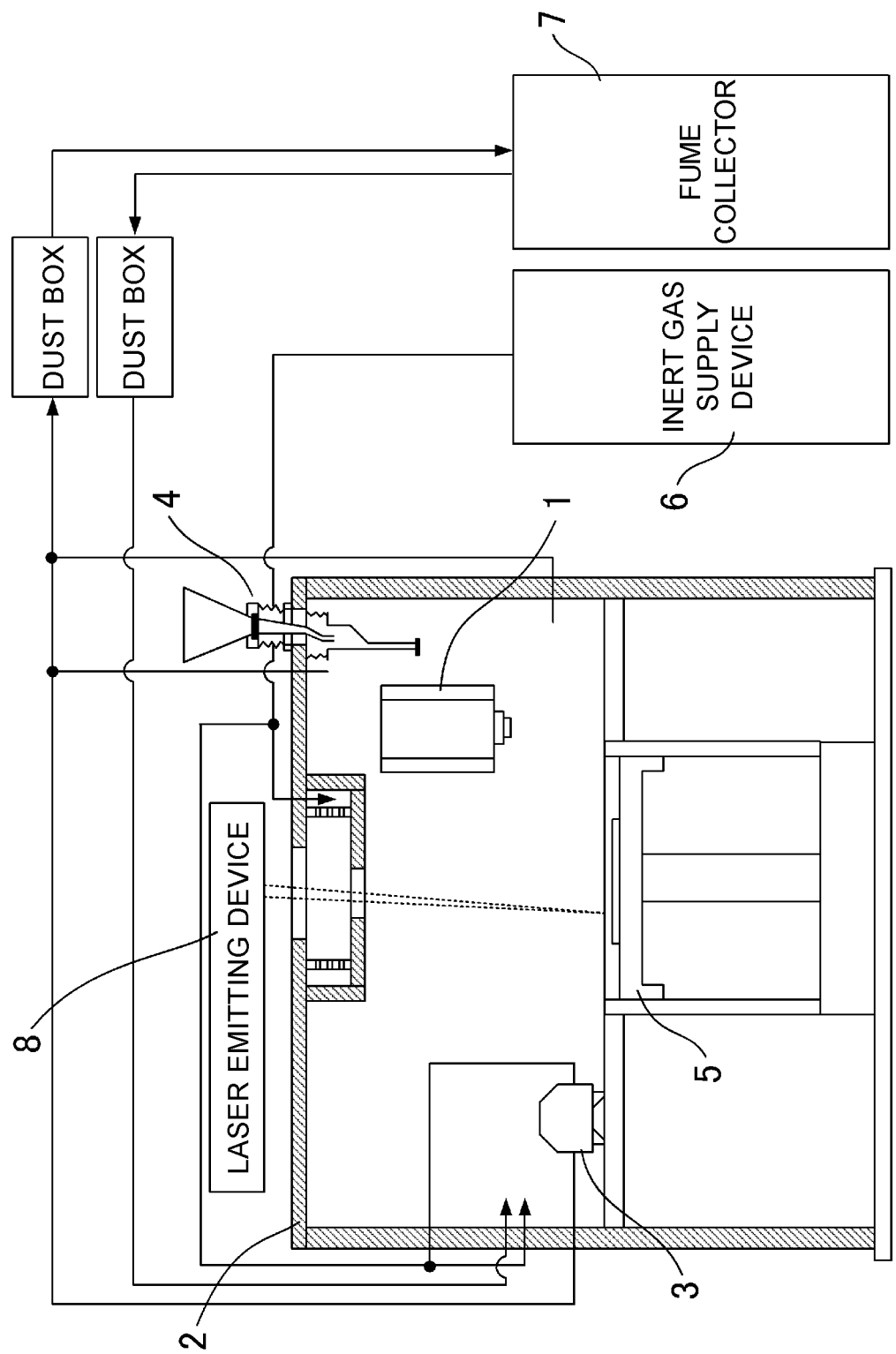

METAL POWDER MATERIAL FOR METAL POWDER LAMINATION MOLDING

CROSS-REFERENCE TO RELATED APPLICATION

This application claims the priority of Japan patent application serial no. 2017-199218, filed on Oct. 13, 2017. The entirety of the above-mentioned patent application is hereby incorporated by reference herein and made a part of this specification.

BACKGROUND

Technical Field

The disclosure relates to a metal powder material for metal powder lamination molding. Particularly, the disclosure relates to a metal powder material for producing a three-dimensionally molded article made of steel equivalent to maraging steel.

Related Art

A metal powder lamination molding method in which a laser beam or an electron beam is emitted to a metal powder material and a desired three-dimensionally molded article is produced is known. It can be said that a metal element that can exist as a powder at room temperature, is melted by a laser beam or an electron beam, is solidified by cooling, and exists as a solid at room temperature essentially can be used as a metal powder material for metal powder lamination molding. As a metal powder material suitable for metal powder lamination molding, a metal powder material having the same composition as maraging steel may actually be used.

For example, in Japanese Patent No. 5579893, a composition of a metal powder material for metal powder lamination molding of 18Ni maraging steel containing nickel at 17 weight % or more and 19 weight % or less, and 20Ni maraging steel containing nickel at 19 weight % or more and 20 weight % or less and excluding cobalt and molybdenum is specifically disclosed. For example, in order to obtain the required hardness and tensile strength after an aging treatment, 18Ni maraging steel contains cobalt at 7 weight % or more and 13 weight % or less, molybdenum at 3 weight % or more and 5 weight % or less, titanium at 0.2 weight % or more and 2 weight % or less, and aluminum at 0.5 weight % or more and 1.5 weight % or less as indispensable elements.

Cobalt contained in maraging steel is an element indispensable for high hardness and high strength industrial products such as jet engines, turbines, molds, and cutting tools. However, since regions in which cobalt can be produced from minerals are limited worldwide, its use is restricted. In addition, cobalt is a specific chemical substance in the Industrial Safety and Health Act and since it is an element that is not inherently present in the human body, it has been noted when it enters and is accumulated in the body, certain adverse effects may be caused, depending on the intake amount.

20Ni maraging steel, which is so-called cobalt-free maraging steel, has high nickel and titanium contents in order to maintain the required hardness and high strength without cobalt and molybdenum, and is thought to be relatively less flexible and difficult to cut because the hardness and strength are mainly derived from nickel and titanium. Thus, it is not suitable as a metal powder material in metal powder lamination molding for improving the shape accuracy of a three-dimensionally molded article when forming a shape of a sintered product during molding by cutting.

The disclosure provides a metal powder material for metal powder lamination molding through which it is possible to produce a steel material not containing cobalt and having the properties of maraging steel. Several advantages that can be obtained in the disclosure will be described in detail where appropriate in the detailed description of embodiments.

SUMMARY

A metal powder material for metal powder lamination molding of the disclosure contains iron at 76 weight % or more, carbon at 0.03 weight % or less, silicon at 0.12 weight % or less, manganese at 0.12 weight % or less, nickel at 17 weight % or more and 19 weight % or less, molybdenum at 1.5 weight % or more and 2.5 weight % or less, titanium at 0.5 weight % or more and 2.0 weight % or less, and aluminum at 1.5 weight % or less (including 0 weight %), with the remainder being inevitably incorporated impurities at less than 0.01 weight %.

BRIEF DESCRIPTION OF THE DRAWING

FIG. 1 is a cross-sectional view of a metal laminate molding device configured to produce a three-dimensionally molded article using a metal powder material of the disclosure.

DESCRIPTION OF THE EMBODIMENTS

A metal powder material of the disclosure is a steel material that has a carbon content of 0.03 weight % or less and is cured by performing an appropriate aging treatment after martensite is created and has an excellent cuttability before curing according to an aging treatment. Since it is possible to prevent damage to a tool and excessive wear, for example, when a predetermined number of melted and solidified layers are formed and milling can be then performed using a tool with small a cutting edge without using a cutting fluid, in metal powder lamination molding, a shape of a sintered product during molding can be formed by cutting. Thus, it is possible to improve the shape accuracy of a product of maraging steel on which finish processing by cutting is difficult.

Since the metal powder material of the disclosure has a predetermined content of molybdenum, nickel, and titanium, it is possible to obtain sufficiently high hardness and relatively high tensile strength after the aging treatment. Thus, the metal powder material of the disclosure has characteristics of maraging steel, such as excellent flexibility, less distortion due to an aging treatment, an easy nitriding treatment, and a low coefficient of thermal expansion. Thus, it is useful for producing a mold or a metal part according to a metal powder lamination molding method. In addition, since no cobalt is contained, handling of a material including management is relatively simple, and production efficiency is improved. In addition, the safety becomes high.

In a broad sense that a carbon content is 0.03 weight % and an aging treatment is performed after martensite transformation, a metal powder material of the disclosure corresponds to a maraging steel material. However, since general maraging steel is a nickel alloy steel containing cobalt, the metal powder material of the disclosure does not exactly correspond to a maraging steel material. In addition, similarly, cobalt-free maraging steel does not exactly correspond to a maraging steel material because it does not include cobalt and molybdenum which is closely related to cobalt, but it has increased contents of nickel and titanium.

In the disclosure, although a heat treatment process in which a steel material is produced using the metal powder material of the disclosure is the same as in maraging steel, and properties of a produced steel material are almost the same as those of maraging steel, a steel material equivalent to maraging steel is referred to in order to avoid misunderstanding. In addition, precisely, a three-dimensionally molded article before an aging treatment produced by a metal laminate molding device is an intermediate material rather than a steel material equivalent to maraging steel, but it is sometimes represented as a three-dimensionally molded article equivalent to maraging steel for convenience of description.

While cobalt does not directly contribute to curing of maraging steel, it is presumed to have an action of lowering a solid solubility limit of molybdenum and promoting precipitation. In addition, it has been found that cobalt is unrelated to precipitation of titanium. Thus, generally, for example, when cobalt is removed as in 20Ni maraging steel, it should be noted that related molybdenum is also removed, and amounts of nickel and titanium are increased in order to obtain the hardness and tensile strength.

A metal powder material for metal powder lamination molding of the disclosure is a material for producing a three-dimensionally molded article equivalent to 18Ni maraging steel. The fundamental technical idea for the metal powder material of the disclosure is that cobalt is removed from a composition of 18Ni maraging steel. However, molybdenum related to cobalt remains without being removed, and an amount of iron is increased in principle without increasing amounts of nickel and titanium with respect to change in content according to removal of cobalt.

A specific composition of the disclosure is as follows:
iron (Fe) at 76 weight % or more,
carbon (C) at 0.03 weight % or less,
silicon (Si) at 0.12 weight % or less,
manganese at (Mn) 0.12 weight % or less,
nickel (Ni) at 17 weight % or more and 19 weight % or less,
molybdenum (Mo) at 1.5 weight % or more and 2.5 weight % or less,
titanium (Ti) at 0.5 weight % or more and 2.0 weight % or less, and
aluminum (Al) at 1.5 weight % or less,
with the remainder being inevitably incorporated impurities at less than 0.01 weight %.

However, this means that impurities as single elements are contained at less than 0.01 weight % in a range in which a performance for steel equivalent to maraging steel is maintained, and it does not mean that impurities are contained at less than 0.01 weight % with respect to a total content of elements of a plurality of types when the impurities are composed of a plurality of elements. Here, in the disclosure, aluminum is not an essential component element, and may not be contained.

Since the metal powder material for metal powder lamination molding of the disclosure contains no cobalt, and does not have increased contents of nickel and titanium in order to maintain the hardness and the tensile strength, a cuttability of a sintered product during molding is favorable. Thus, in metal powder lamination molding, when a sintered product is cut during molding, it is possible to improve the shape accuracy of a three-dimensionally molded article. Since it is possible to obtain final properties equivalent to those of maraging steel, it is possible to obtain a three-dimensionally molded article with less deformation and distortion and with high accuracy.

It has been found that, since a steel material equivalent to maraging steel produced using the metal powder material of the disclosure does not contain cobalt, its hardness does not change much as compared with 18Ni maraging steel of the same class, and its tensile strength is lowered to some extent. Further, other properties of the steel material equivalent to maraging steel produced using the metal powder material of the disclosure are substantially the same as those of general maraging steel.

EXAMPLE 1

Components contained in Example 1 are shown in Table 1. The hardness is a numerical value after age hardening and the numerical value in parentheses is the hardness during molding before age hardening. A content of molybdenum (Mo) that directly affected the hardness was decreased, a content of titanium (Ti) was relatively increased, and in order to check basic values, as much impurities were removed as possible.

TABLE 1

| | | Equivalent to 18Ni maraging steel | | | | | | | | |
|---|---|---|---|---|---|---|---|---|---|---|
| HRC | Tensile strength | Fe | C | Si | Mn | Ni | Co | Mo | Al | Ti |
| 51.5 (32.1) | 1786 MPa | 78.07 | 0.01 | 0.00 | 0.00 | 17.88 | 0.00 | 1.75 | 0.18 | 2.00 |

EXAMPLE 2

Components contained in Example 2 are shown in Table 2. The hardness is a numerical value after age hardening and the numerical value in parentheses is the hardness during molding before age hardening. Unlike Example 1, a content of molybdenum (Mo) was increased and a content of titanium (Ti) was decreased, the content of other metal elements was as is standard for general 18Ni maraging steel, and 0.01 weight % of cobalt was intentionally added according to an error range. Based on test results, it can be concluded that there was the same performance in a case in which cobalt was contained in this error range and a case in which substantially no cobalt was contained.

TABLE 2

| | | Equivalent to 18Ni maraging steel | | | | | | | | |
|---|---|---|---|---|---|---|---|---|---|---|
| HRC | Tensile strength | Fe | C | Si | Mn | Ni | Co | Mo | Al | Ti |
| 52.1 (34.5) | 1780 MPa | 77.35 | 0.02 | 0.27 | 0.02 | 18.18 | 0.01 | 2.18 | 1.08 | 0.82 |

COMPARATIVE EXAMPLE

Nominal values of 18Ni maraging steel of commercially available powder are shown in Table 3.

TABLE 3

| | | 18Ni maraging steel | | | | | | | | |
|---|---|---|---|---|---|---|---|---|---|---|
| HRC | Tensile strength | Fe | C | Si | Mn | Ni | Co | Mo | Al | Ti |
| 51.6 (38.5) | 1930 MPa | 66.60 | 0.02 | 0.27 | 0.00 | 18.44 | 8.85 | 4.60 | 0.25 | 0.90 |

An average particle size of powder particles in the metal powder material of the disclosure is 10 μm or more and 50 μm or less. If a single metal element powder is included as a metal powder material in metal powder lamination molding, there is a high likelihood of properties of the metal powder material changing when unsintered metal powder material is collected and reused. Therefore, powders are all alloys that contain carbon in some cases.

A method of using the metal powder material of the disclosure will be described below with reference to FIG. 1. FIG. 1 shows an example of a metal laminate molding device which is generally referred to as a metal 3D printer. FIG. 1 shows a cross section of the metal laminate molding device on the right side from the front. The metal laminate molding device shown in FIG. 1 includes a cutting device 1. Specifically, the metal laminate molding device includes a chamber 2, a recoater head 3, a material supply device 4, a molding table 5, an inert gas supply device 6, a fume collector 7, and a laser emitting device 8.

The molding table 5 that is movable upward and downward forms a predetermined molding area in a molding chamber formed by the chamber 2. The inside of the molding chamber is filled with an inert gas supplied from the inert gas supply device 6, for example, nitrogen gas, and an oxygen concentration is maintained at less than 3 weight %, and oxidation of the metal powder material is prevented. Metallic fumes generated when the metal powder material is sintered by a laser beam with a predetermined energy emitted from the laser emitting device 8 are removed by the fume collector 7 and thereby the nitrogen gas is purified.

The metal powder material obtained by mixing powder particles of alloys containing a predetermined content of metal elements according to the disclosure is supplied from the material supply device 4 to the recoater head 3. The recoater head 3 sprays the metal powder material toward a predetermined molding area formed on the molding table 5 adjusted to a uniform height of 30 μm or more and 100 μm or less.

After the metal powder material is sprayed thereon, a laser beam with a predetermined energy is emitted according to a desired contour shape of a three-dimensionally molded article and a sintered layer is formed. Metal powder material that is not sintered is collected after molding. According to a laser beam emission method, the metal powder material can be sintered while martensite is created. It should be noted that martensite can be created after the three-dimensionally molded article is produced.

For example, since the metal powder material of the disclosure of Example 1 had a hardness during sintering of HRC 34.5, cutting without cutting fluid was possible. Therefore, by appropriate driving of the cutting device 1 during molding, a contour or a surface of a sintered product during molding could be cut, and it was possible to improve the shape accuracy of maraging steel on which finish processing is difficult after molding. In addition, it was possible to remove metal protrusions unexpectedly formed on the surface of a sintered product during molding by cutting, and it was possible to avoid interruption of a continuous molding process. In particular, for example, Example 1 had lower nominal values of the hardness before age hardening than those of the 18Ni maraging steel of the commercially available powder shown in Table 3, and wear of a tool was reduced to a low level.

After the three-dimensionally molded article having a desired shape is produced, it is cured by performing an appropriate aging treatment, and thus it is possible to produce a three-dimensionally molded article made of steel equivalent to maraging steel. Since hardly any cobalt that contributes to precipitation of molybdenum is contained, the hardness and tensile hardness derived from molybdenum are low, and as shown in Table 1 to Table 3, compared with general 18Ni maraging steel of the same class, in particular, the tensile strength is lowered to some extent. However, features of maraging steel are still retained and it is useful for a mold or a metal part for which high shape accuracy is required.

The metal powder material of the disclosure is particularly useful for metal powder lamination molding when a desired three-dimensionally molded article is cut during molding to form a shape. Since the metal powder material of the disclosure does not contain cobalt which is a strategic material, handling becomes easier, and production efficiency is improved. In addition, since it is unclear whether cobalt is harmful to the human body, the metal powder material of the disclosure containing no cobalt has excellent safety.

The steel material produced according to the example of the disclosure described above retains the properties of maraging steel. As long as the technical idea of the disclosure is not impaired, the disclosure is effective even if a compositional content is not exactly the same as that specifically shown in the example as long as the same performance as in the example can be obtained.

The disclosure can be applied to three-dimensional optical molding according to a metal powder lamination molding method. The disclosure is effective as a metal powder material for metal powder lamination molding because there is less deformation and distortion after the martensitic three-dimensionally molded article is subjected to an aging treatment. According to the disclosure, it is possible to obtain sufficient shape accuracy, hardness, and tensile strength required for a molded article. The disclosure contributes to progress in metal powder lamination molding technology and the development of the mold industry and metal part industry.

What is claimed is:

1. A metal powder material for metal powder lamination molding, said material having properties equivalent to those of maraging steel, and obtained by mixing powder particles having the following components:
   iron (Fe) at 76 weight % or more,
   carbon (C) at 0.03 weight % or less,
   silicon (Si) at 0.12 weight % or less,
   manganese (Mn) at 0.12 weight % or less,
   nickel (Ni) at 17 weight % or more and 19 weight % or less,
   molybdenum (Mo) at 1.5 weight % or more and 2.5 weight % or less,
   titanium (Ti) at 0.5 weight % or more and 2.0 weight % or less, and
   aluminum (Al) at 1.08 weight % or more and 1.5 weight % or less,
   with the remainder being inevitably incorporated impurities at less than 0.01 weight %.

2. The metal powder material according to claim 1, wherein an average particle size of the powder particles is 10 µm or more and 50 µm or less.

3. A three-dimensionally molded article made of the metal powder material according to claim 1, wherein the three-dimensionally molded article has not been subject to an aging treatment and has a lower hardness than a 18Ni maraging steel before aging treatment.

4. A three-dimensionally molded article made of the metal powder material according to claim 1, wherein the three-dimensionally molded article has been subject to an aging treatment and has a lower tensile strength than a 18Ni maraging steel after aging treatment.

* * * * *